United States Patent Office 3,706,677
Patented Dec. 19, 1972

3,706,677
POLYXYLYLIDENE ARTICLES
Ritchie A. Wessling, Midland, and Ray G. Zimmerman, Shepherd, Mich., assignors to The Dow Chemical Company, Midland, Mich.
No Drawing. Continuation-in-part of application Ser. No. 617,832, Feb. 23, 1967, now Patent No. 3,532,643. This application Oct. 5, 1970, Ser. No. 78,154
The portion of the term of the patent subsequent to Sept. 10, 1985, has been disclaimed
Int. Cl. C08f 47/00
U.S. Cl. 260—2 H
14 Claims

ABSTRACT OF THE DISCLOSURE

The compositions are of the class of polyxylylidene having a high degree of polymerization in the form of coatings, films, fibers or foams. Such articles are prepared from polyelectrolytes comprising viscous aqueous solutions of p-phenylene dimethylene bis(dialkyl sulfonium salts), or the analogous hydroxide, by shaping such viscous aqueous solutions, for example by casting a wet film or extruding the solution into a basic aqueous bath, then drying, sometimes with heating, to convert the sulfonium polyelectrolyte to a polyxylylidene in the form of a film, coating, fiber or foam.

CROSS-REFERENCES TO RELATED APPLICATIONS

This application is a continuation-in-part of application Ser. No. 617,832, filed Feb. 23, 1967, now U.S. Pat. 3,532,643.

BACKGROUND OF THE INVENTION

(1) Field of the invention

This invention relates to polyxylylidenes, especially novel polyxylylidenes having a high degree of polymerization in the form of coatings, films, fibers or foams.

(2) Description of the prior art

Polyxylylidenes are known in the art. See for example those described in U.S. Pat. 3,110,687. However, they are generally characterized by a low degree of polymerization such as from 2 to 100. The polymers obtained heretofore are infusible, yellow or darker, fluorescent powders of limited utility and generally poor mechanical properties. Hence, coatings, films, fibers or foams from them would be extremely difficult or impossible to prepare. In addition, these polymers usually contain halogen atoms such as chlorine or bromine attached to non-aromatic carbon atoms, which impart thermal instability.

SUMMARY

It is a primary object of this invention to provide polyxylylidenes which are useful in the form of coatings, films, fibers and foams, thereby making them useful in a wide variety of applications. It is a further object to provide articles having good mechanical properties from polyxylylidenes having a degree of polymerization of about 150 or higher. It is still another object to provide a method for preparing polyxylylidene coatings, films, fibers and foams.

The foregoing and other objects are obtained by a method comprising preparing a polyelectrolyte comprising a viscous aqueous solution of a p-phenylene dimethylene bis(dialkyl sulfonium salt), or the analogous hydroxide, shaping the viscous solution of polyelectrolyte, drying the resulting wet shaped article and converting the polyelectrolyte comprising the article to a polyxylylidene of the structure

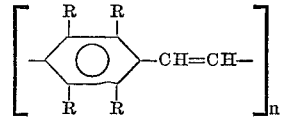

where R is hydrogen, an alkyl having from 1 to 4 carbon atoms or a halogen having an atomic number not greater than 35, with the proviso that not more than 2 of the R's are either a halogen or an alkyl having from 2 to 4 carbon atoms and n is a number from about 150 to about 20,000. The shaping often results in a wet film on a substrate from which it may be stripped, after being dried, as a self-supporting film or is adhered to the substrate as a coating to constitute the article but other forms such as extrudates especially in the form of threadlike articles such as a fiber may also be obtained. Alternatively, the wet film may be heated rapidly to provide a sheet of foam of the polyxylylidene.

DESCRIPTION OF THE PREFERRED EMBODIMENTS

This invention relates to novel polyxylylidenes having a high degree of polymerization. More specifically, this invention relates to coatings, films, fibers and foams of polyxylylidenes having recurring units of the structure

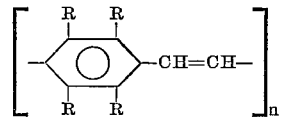
(I)

where R is hydrogen, an alkyl having from 1 to 4 carbon atoms or a halogen having an atomic number not greater than 35 with the proviso that not more than 2 of the R's is either a halogen or an alkyl having from 2 to 4 carbon atoms, and n is a number from about 150 to about 20,000, especially from about 500 to about 6,000. The alkyl groups are represented by methyl, ethyl, n-propyl, isopropyl, n-butyl, isobutyl, and tert-butyl and the halogens by fluorine, chlorine and bromine. Shaped articles with the polymer in oriented state allows use of lower molecular weights, i.e., smaller value of n, than would be possible with the polymer in the unoriented state.

The compositions forming the articles of the invention are intensely colored, usually ranging from yellow-orange to deep red to brown, and show strong absorption of ultraviolet light as well as being fluorescent when exposed to ultraviolet light. The mechanical properties of polymers of the invention are those characteristic of hard, brittle, infusible solids. However, in the form of films and coatings the polymers are sufficiently flexible so that when adhered to materials such as paper, they do not crack readily and the polymers also provide foams which have considerable flexibility.

In accordance with this invention it has now been discovered that articles of polyxylylidene having recurring units and properties of the type described above can be prepared by converting water-soluble polyelectrolytes by the method described in application Ser. No. 591,706, filed Nov. 3, 1966, now U.S. Pat. 3,401,152, which was copending with application Ser. No. 617,832, filed Feb. 23, 1967, of which this application is a continuation-in-part. These polyelectrolytes are derived from monomeric sulfonium salts and have recurring units of the structure

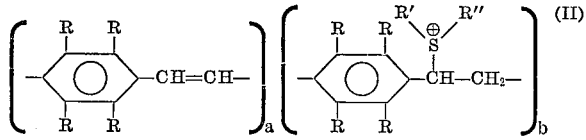
(II)

wherein R is as described above for the polyxylylidene,

R′ and R″ each represents an alkyl or hydroxyalkyl group containing from 1 to 4 carbon atoms, and A is a counterion which can be derived from any low molecular weight acid so long as it does not precipitate polymer or react with polymer in aqueous solution. Suitable low molecular weight acids from which the counterion A can be derived include both inorganic acids such as hydrohalic acids which provide a halide ion, e.g., chloride or bromide ion, and carbonic acid which provides a bicarbonate ion, and organic acids such as acetic, propionic, butyric, maleic, citric, or oxalic acid. The ratio of the units comprising the polyelectrolyte structure in a random grouping is represented by the integers $a$ and $b$ in which the ratio $a:b$ ranges from about 1:10 to about 3:1 or to the ratio corresponding to the point of incipient water insolubility. The polyelectrolytes useful in the practice of the invention can either be isolated or directly reacted from the solution in which they were prepared.

The conversion step in the above procedure can be carried out by any process which will cause the sulfonium side group to eliminate leaving a double bond, i.e.,

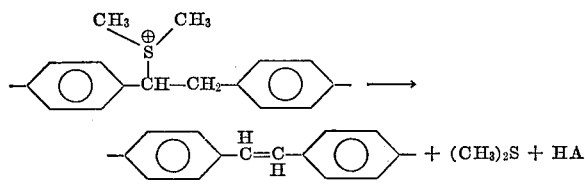

Normally, this process is carried out by drying the polyelectrolyte and heating if necessary to induce decomposition. The decomposition can be carried out at temperatures between about 0° and 300° C. depending on the choice of counterion or anion. For example, anions such as the hydroxide ion permit conversion at low temperatures; anions such as the chloride ion can be converted at intermediate temperatures; and anions such as the maleate ion can be converted at maximum temperatures.

Decomposition of the polyelectrolyte by any suitable treatment which will eliminate the sulfonium side group, such as by thermal treatment, will generate polyxylylidene. In converting to polyxylylidene the chemical reaction involves only substituents on the polymer chain, and does not involve a change in the degree of polymerization.

The color and thermal stability of the poly-p-xylylidenes depend on several factors. The most important are: conjugated sequence length; and cis/trans double bond ratio. The first is primarily a function of degree of polymerization but is also influenced by the presence of saturated groups caused by side reactions during polymerization or subsequent cross-linking reactions. The cis/trans ratio depends on the temperature at which the unsaturated polymer is formed. Low temperature cures favor both trans double bond formation and long conjugated sequence formation. Therefore, polyxylylidenes preferably are prepared at the lowest temperatures feasible. This is best accomplished by reaction of the polyelectrolyte in the hydroxide form.

This invention is particularly concerned with shaped articles in which a polyxylylidene component constitutes a continuous phase and is in a form having considerably greater length than at least one other dimension such as width, thickness or diameter. Usually the length is at least 10 times the smallest of the other dimensions and may be extremely large, as obtained in a continuous process for preparing a film or a fiber. Representative forms are foams, fibers or filaments, self-supporting films, and films adhered to a substrate; i.e., a coating. Suitable substrates include glass, paper, wood, plastics, rubber, metallic materials such as iron, steel, aluminum, magnesium and galvanized iron and various textile materials. These substrates may be in the form of sheets, woven or nonwoven fabrics, shaped articles and the like. The polyxylylidene component may contain fillers such as carbon black and calcium carbonate.

To prepare the polyxylylidene articles, the essential shaping is carried out with the precursers of the polyxylylidene, i.e., before conversion of the water-soluble polyelectrolyte, or concurrently with the early stages of such conversion to the polyxylylidene. For example, the aqueous solution of polyelectrolyte, prepared as described in United States Pat. No. 3,401,152, is cast as a wet-film onto a glass plate, then that wet film is dried and converted to polyxylylidene as previously described. The resulting film may then be stripped from the glass plate in the form of a self-supporting film or may be left on the glass plate as a coating. Coatings can be applied to the various substrates by a similar procedure.

Fibers are prepared by extruding the aqueous polyelectrolyte into an aqueous, strongly basic solution at a temperature of from about 0° C. to about 100° C. Thereby, the dissolved polyelectrolyte forms a thread-like coagulate which is converted to a polyxylylidene fiber by heating at a temperature from about 25° C. to about 300° C., the particular temperature depending somewhat on the identity of the counterion of the polyelectrolyte as described above. The threadlike coagulate may be dried and cured in a single step or in stage-wise manner by drying at the lower portion of the above-noted temperature range, then curing at a higher temperature.

Fibers are also prepared by first casting a wet film of the polyelectrolyte, drying the wet film at a temperature below about 90° C., orienting the resulting film by drawing, then heating at a higher temperature and subsequently converting the oriented film to filaments. Alternatively, the dried film may be slit into strips before being drawn.

Foams are prepared by casting a wet film of the polyelectrolyte, drying the wet film, very rapidly raising the temperature of the dried film to a temperature from about 200° C. to about 350° C. so that the film expands to a cellular material before the polyelectrolyte is converted substantially completely to a polyxylylidene. Usually, in this method for preparation of foams, the counterion of the polyelectrolyte is hydroxide or bicarbonate.

The smallest dimension, e.g., width, thickness or diameter, of the polyxylylidene portion of the shaped article ordinarily ranges from about 0.1 mil to about 100 mils. The lowest value of this smaller dimension is obtained in fibers, and the highest value of the smaller dimension is obtained with foams.

The following examples are provided for illustration and not for the purpose of limitation. Unless otherwise indicated, all parts and percentages are by weight.

EXAMPLE I (A) Preparation of a solution of polyelectrolyte derived from p-phenylene dimethylene bis (diethyl sulfonium chloride)

500 ml. of 2.0 N p-phenylene dimethylene bis (diethyl sulfonium chloride) was cooled to 0° C. and purged with nitrogen. Added thereto with rapid stirring was 500 ml. of 2.0 N sodium hydroxide which was prechilled to 0° C. and also purged with nitrogen. The materials gelled almost immediately on contact with each other. The reaction mixture turned orange-brown upon starting of the reaction which was allowed to continue for 15 minutes with the color of the mixture turning a greenish yellow. After 15 minutes, 500 ml. of 1 N HCl was added to the reaction mixture to quench it. The material, being highly viscous, was cut into pieces with a pair of scissors and placed in a Waring Blendor. Approximately 2200 ml. of water was added thereto and mixing was continued until a pourable liquid resulted. The pH of the mixture was 6.

The material was dialyzed against deionized water, then run through a Waring Blendor to disperse a few gel pieces. The total volume of material after dialysis was 6900 ml. This polyelectrolyte material had a normality of 0.03. The solution was found to have a solids content of 0.3971 percent as determined by taking 50.0006 grams thereof and drying in an air oven at 70° C. for 24 hours then at 140° C. for 4 hours.

The polyelectrolyte thus prepared consisted mainly of the following structural unit

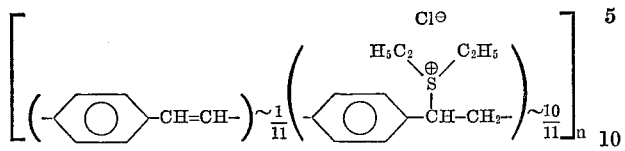

wherein $n$, the number average degree of polymerization, was observed to be approximately 2800. The yield of the high molecular weight polyelectrolyte was calculated to be 41 percent (207 meq.).

(B) Preparation of a film of poly-p-xylylidene

A portion of the solution of polyelectrolyte prepared in I(A) was cast on a glass plate and dried at 90° C. in an air oven whereby there was obtained a clear, flexible, film having a bright greenish-yellow color. The glass plate with that film attached was transferred to a vacuum oven which was maintained at a temperature of 180° C. and a pressure of 1 millimeter of mercury for 16 hours. There was obtained thereby an orange, transparent, flexible film. The polymeric composition of the film was confirmed as poly-p-xylylidene by infra red analysis.

EXAMPLE II

To another 100-milliliter portion of the polyelectrolyte solution of Example 1(A) were added 900 milliliters of water and 50 milliliters of quaternary ammonium strong base anion exchange resin beads in the basic or hydroxide form, e.g., a resinous, cross-linked, polymeric vinylbenzyl trimethyl ammonium hydroxide. Such ion exchange resins are well known in the art as disclosed in U.S. Pats. 2,591,- 573 and 2,614,099. The resulting mixture thickened and began to turn green. The ion exchange beads were separated by filtration and the filtrate solution was cast as a wet film on a glass plate, then evaporated to dryness at 70° C. The product was a bright orange, brittle, transparent, water-insoluble film of poly-p-xylylidene adhered to the glass. The product was identified by infrared spectra and had a number average degree of polymerization of about 2800.

Coatings of poly-p-xylylidene on steel, wood and paper were prepared in substantially the same manner.

EXAMPLE III 250 ml. of the polyelectrolyte prepared in Example I(A) was mixed with 750 ml. of methyl alcohol, then the viscous solution was passed through an ion exchange column containing a strong base anion exchange resin similar to the type employed in Example II. Polymer was eluted from the column with a 3:1 mixture of methyl alcohol and water. The initial hydroxide-containing polymer to come off the column was a yellow, viscous solution and, as elution continued, the viscosity dropped and the solution became orange in color and showed yellow fluorescence under ultra violet excitation. Substantially all of the polyelectrolyte, in the hydroxide form, was taken off the column in three cuts (approximately 100 percent conversion), the first cut was 1200 ml., and the next two were 1000 ml. each. From the first cut, a film was cast and dried, first in air at 65° C., then under vacuum at 180° C. A hard, orange, water-insoluble, translucent film of poly-p-xylylidene having a number average degree of polymerization of about 2800 was obtained. The product was identified by infrared spectra. The X-ray analysis showed the film contained less than 0.1 percent chlorine. The yield of poly-p-xylylidene from the first cut was 0.6 gram; from the second and third cuts taken together the yield was also 0.6 gram.

Following the same procedure as above except for varying the concentrations of reactants used to prepare the polyelectrolyte, films of poly-p-xylylidene having a degree of polymerization ranging from about 700 to about 4500 were prepared.

EXAMPLE IV

An aqueous solution was prepared from 19.5 grams of 2,5-dimethyl-p-phenylene dimethylene bis (diethyl sulfonium chloride) and 250 ml. of deionized water. After cooling to 5° C. and flushing with nitrogen, 50 ml. of cold 1 N sodium hydroxide solution was added with rapid stirring. After 10 minutes, the mixture, containing an intermediate polyelectrolyte similar to that described in U.S. Pat. No. 3,401,152, was diluted to 4000 ml. with ice water. The mixture was dialyzed against deionized water to isolate the polyelectrolyte obtained from the salt byproduct.

By following a procedure similar to that employed in Example I(B), a film is obtained of poly-2,5-dimethyl-p-xylylidene having a degree of polymerization of about 6000.

EXAMPLE V

To 500 milliliters of a 0.4 N aqueous solution of p-xylylene bis (diethyl sulfonium chloride) was added 500 milliliters of a 0.2 N aqueous solution of sodium hydroxide at a temperature of 0° C. The resulting reaction was allowed to continue for 6 hours then was quenched by adding 100 milliliters of 1 N hydrochloric acid to the reaction mixture. The product was dialyzed against ice water (4 times). A portion of the dialyzed product, i.e., the polyelectrolyte solution, was reduced to about 80 percent of its original volume by evaporation of water, then cast as a film on a glass plate and dried in an air oven for 17 hours at 90° C. The dried film was stripped from the glass plate and was placed in a press between sheets of polytetrafluoroethylene and then cured for 30 minutes at 250° C. under a pressure of 2500 pounds per square inch. A film similar to that obtained in Example I(B) was obtained which had a thickness of 0.44 mil, a tensile strength of $4.9 \times 10^5$ grams per square centimeter and an elongation of 3.5 percent.

EXAMPLE VI

Another portion of the polyelectrolyte solution of I(A) was extruded into an aqueous bath maintained at from 45° C. to 55° C. containing sodium hydroxide at a concentration of 50 percent by weight. The resulting viscous extruded stream coagulated to form a fiber which was converted to a poly-p-xylylidene fiber by heating at 200° C. for 30 minutes.

EXAMPLE VII

Another portion of the polyelectrolyte solution of Example V was cast on a glass plate and dried at 90° C. in an air oven. The resulting dry film was stripped from the glass plate and cut into strips about 2 inches by 1/16 inch. The strips were grasped at each end with tweezers, placed in a hot air stream at about 200° C. and drawn, easily, to a 10:1 draw ratio. Further heating under tension converted the drawn, oriented strip to poly-p-xylylidene as indicated by a color change from greenish yellow to deep gold. After additional curing for 30 seconds at 300° C., the strips were fibrillated easily into fine, tough lustrous filaments having a gold color.

In a comparative experiment it was found that film strips from the same polyelectrolyte solution which were dried at 90° C., then heated at 180° C. for 16 hours were converted to a film of poly-p-xylylidene which would not draw.

EXAMPLE VIII

Another portion of the polyelectrolyte solution of Example I(A) was spread into a thin layer which was air dried at 60° C., then shock heated to 250° C. The thin layer expanded into a fine-celled flexible foam sheet which, by further heating at 250° C., was converted to a foam of poly-p-xylylidene having a degree of polymerization of about 2800.

EXAMPLE IX

An aqueous solution of p-xylene bis (dimethyl sulfonium chloride) at a concentration of 0.5 N was passed through an ion exchange column at a temperature of 0° C. and containing the same kind of anion exchange resin beads described in Example II. The eluted product was a pale yellow-green, aqueous syrup. The syrup was frozen at Dry Ice temperature with essentially all of the water being removed by vacuum sublimation. The resulting product was a tough, orange-red foam which was treated further by heating at 240° C. under reduced pressure. That foam was purified by extraction with methylene chloride, which removed only traces of soluble material. When tested up to 350° C., the extracted foam of poly-p-xylylidene showed no evidence of softening.

EXAMPLE X

A reaction vessel was purged with nitrogen and cooled to, and maintained at, 0° C. There were added thereto 50 cubic centimeters of 1 N p-xylene bis (diethylsulfonium chloride) and 50 cubic centimeters of 4 N sodium hydroxide. The resulting reaction mixture was stirred at 0° C. for 2 hours, next was neutralized with carbon dioxide, then dialyzed against water which was saturated with carbon dioxide, sufficient water being added to the resulting product to give a volume of 450 cubic centimeters. A portion of the product was dried in a flat-bottomed glass container to obtain a film having a thickness of 7 to 8 mils, a weight of 1.8 grams per square centimeter.

The film was placed on a metal surface at 310° C. for a few seconds. Initially the film softened, then foamed substantially uniformly to a yellow-orange foam sheet of poly-p-xylylidene which was soft and flexible and had a thickness two to three times greater than the starting film.

In all the foregoing examples polyxylylidene products having degrees of polymerization greater than 150 and less than 20,000 were produced.

We claim:

1. A shaped article comprising a polyxylylidene in the form of a film, fiber or foam having a length and other dimensions in which the length is large compared with at least one of the other dimensions, said polyxylylidene having recurring units of the structure

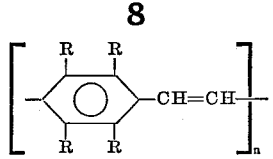

wherein R is hydrogen, an alkyl having from 1 to 4 carbon atoms or a halogen having an atomic number not greater than 35, with the proviso that not more than 2 of the R's are either a halogen or an alkyl having from 2 to 4 carbon atoms, and $n$ is a number from about 500 to about 20,000.

2. The article of claim 1 in which R represents hydrogen.
3. The article of claim 1 in which R represents methyl.
4. The article of claim 1 in which $n$ is from about 500 to about 6000.
5. The article of claim 1 which is in the form of a foam.
6. The article of claim 1 which is in the form of a fiber.
7. The article of claim 1 which the polyxylylidene is in the form of a film.
8. The article of claim 7 in which the film is adhered to a substrate.
9. The article of claim 8 in which the substrate is glass.
10. The article of claim 8 in which the substrate is wood.
11. The article of claim 8 in which the substrate is steel.
12. The article of claim 8 in which the substrate is paper.
13. The article of claim 1 in which one of the dimensions is from about 0.1 mil to about 100 mils.
14. The article of claim 1 which is in the form of a foam having a thickness of less than about 100 mils.

References Cited
UNITED STATES PATENTS

| | | | |
|---|---|---|---|
| 3,401,152 | 9/1968 | Wessling et al. | 260—79 |
| 3,110,687 | 11/1963 | Smith | 260—2 H |
| 3,532,643 | 10/1970 | Wessling et al. | 260—2 H |

JAMES SEIDLECK, Primary Examiner

U.S. Cl. X.R.

117—161 UF; 260—2.5 R

PO-1050
(5/69)

UNITED STATES PATENT OFFICE
CERTIFICATE OF CORRECTION

Patent No. 3,706,677          Dated December 19, 1972

Inventor(s) Ritchie A. Wessling and Ray G. Zimmerman

It is certified that error appears in the above-identified patent and that said Letters Patent are hereby corrected as shown below:

Column 2, lines 65-70, in the formula (second part), insert $$--A^{\ominus}--$$

above the symbol " R" ".

Column 3, lines 21-29, in the formula (top part) insert $$--A^{\ominus}--$$

above the symbol "CH₃".

Signed and sealed this 22nd day of May 1973.

(SEAL)
Attest:

EDWARD M. FLETCHER, JR.
Attesting Officer

ROBERT GOTTSCHALK
Commissioner of Patents